(12) United States Patent
Reiter et al.

(10) Patent No.: US 6,718,877 B2
(45) Date of Patent: Apr. 13, 2004

(54) NIP SAFETY GUARD

(75) Inventors: Greg Reiter, Wildwood, MO (US); Mikhail Goldburt, St. Louis, MO (US); Dave Telken, St. Peters, MO (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/134,622

(22) Filed: Apr. 30, 2002

(65) Prior Publication Data
US 2003/0200880 A1 Oct. 30, 2003

(51) Int. Cl.[7] .............................................. B41F 33/00
(52) U.S. Cl. ...................................... 101/480; 242/913
(58) Field of Search ................................ 101/153, 216, 101/480; 226/180, 181; 242/913

(56) References Cited

U.S. PATENT DOCUMENTS

| | | | | |
|---|---|---|---|---|
| 4,043,731 A | * | 8/1977 | Kratzmann et al. | ......... 425/366 |
| 4,669,380 A | * | 6/1987 | Seib et al. | ................. 101/216 |
| 4,765,240 A | * | 8/1988 | Kraus et al. | ................. 101/216 |
| 5,241,903 A | * | 9/1993 | Lampic | ....................... 100/349 |
| 5,537,922 A | * | 7/1996 | Becker | ....................... 101/216 |
| 6,352,027 B1 | * | 3/2002 | Wadlinger | ................. 101/216 |

FOREIGN PATENT DOCUMENTS

| | | |
|---|---|---|
| DE | 42 04 142 A1 | 8/1993 |
| DE | 43 15 224 A1 | 11/1994 |
| GB | 1 479 996 | 7/1977 |

* cited by examiner

*Primary Examiner*—Daniel J. Colilla
*Assistant Examiner*—Jill E. Culler
(74) *Attorney, Agent, or Firm*—Foley & Lardner

(57) ABSTRACT

A press with a capability to adjust for multiple roll diameters, comprising: a frame; a mounting assembly with at least one adjusting arm for mounting a roll therein, the adjusting arm being moveable to change position relative to the frame in correspondence to a change in diameter of the roll; a guard assembly that provides a guard across a pinch point between a roll and another element, the guard assembly being moveably attached to the at least one adjusting arm and to a portion of the frame to automatically adjust a position of the guard when the at least one adjusting arm is moved in order to maintain a spacing between the guard and the roll within a predetermined range.

19 Claims, 7 Drawing Sheets

NIP SAFETY GUARD

1. Field of the Invention

The present invention relates generally to the field of presses, and more particularly, to presses with structures for providing an adjustable pinch point guard.

2. Background of the Invention

It is frequently necessary to have a pinch point guard covering an area to prevent pinching between a roll and another element. But a problem arises because using an area pinch point guard that covers a whole print area prevents cleaning the printing plate or diecut plate without stopping the press.

SUMMARY OF THE INVENTION

Briefly, one embodiment of the invention comprises a press with a capability to adjust for multiple roll diameters, comprising: a frame; a mounting assembly with at least one adjusting arm for mounting a roll therein, the adjusting arm being moveable to change position relative to the frame in correspondence to a change in diameter of the roll; a guard assembly that provides a guard across a pinch point between a roll and another element, the guard assembly being moveably attached to the at least one adjusting arm and to a portion of the frame to automatically adjust a position of the guard when the at least one adjusting arm is moved in order to maintain a spacing between the guard and the roll within a predetermined range.

In a further embodiment of the present invention, the guard assembly is automatically adjusted to also maintain a spacing between the guard and the other element within a predetermined range.

In a further embodiment of the present invention, the guard comprises a guard bar.

In a further embodiment of the present invention, the guard assembly comprises at least one guard arm for holding said guard, with at least one guard arm being pivotally attached at one part thereof to a pivot axis on said at least one adjusting arm, and attached at a second point adjacent to the guard via a guide slot.

In a further embodiment of the present invention, there are two adjustment arms in the mounting assembly and two guard arms in the guard assembly, with each guard arm pivotally attached to a different one of the adjustment arms.

In a further embodiment of the present invention, the guard arm has substantially the shape of an S.

In a further embodiment of the present invention, the guide slot is a radial slot centered on an anilox roll.

In a further embodiment of the present invention, guide slot is disposed in the frame.

In a further embodiment of the present invention, the guard arm comprises at least two pieces.

In a further embodiment of the present invention, the mounting assembly is moved by a power element.

In a further embodiment of the present invention, the press is a printing press.

In a further embodiment of the present invention, the press is a diecutter.

In a further embodiment of the present invention, a method is provided for adjusting pinch point guard in a press, comprising the steps of: moving a mounting assembly for a roll relative to a frame in correspondence to a change in diameter of the roll; and automatically moving a guard bar in unison with the movement of the mounting assembly to adjust a position of the guard bar to automatically maintain a spacing between the guard bar and the roll and between the guard and another element within a predetermined range.

In a further embodiment of the present invention, the step of automatically moving a guard bar comprises causing the guard bar to follow a radial motion.

DETAILED DESCRIPTION OF THE PREFERRED EMBODIMENTS

Figure 1:
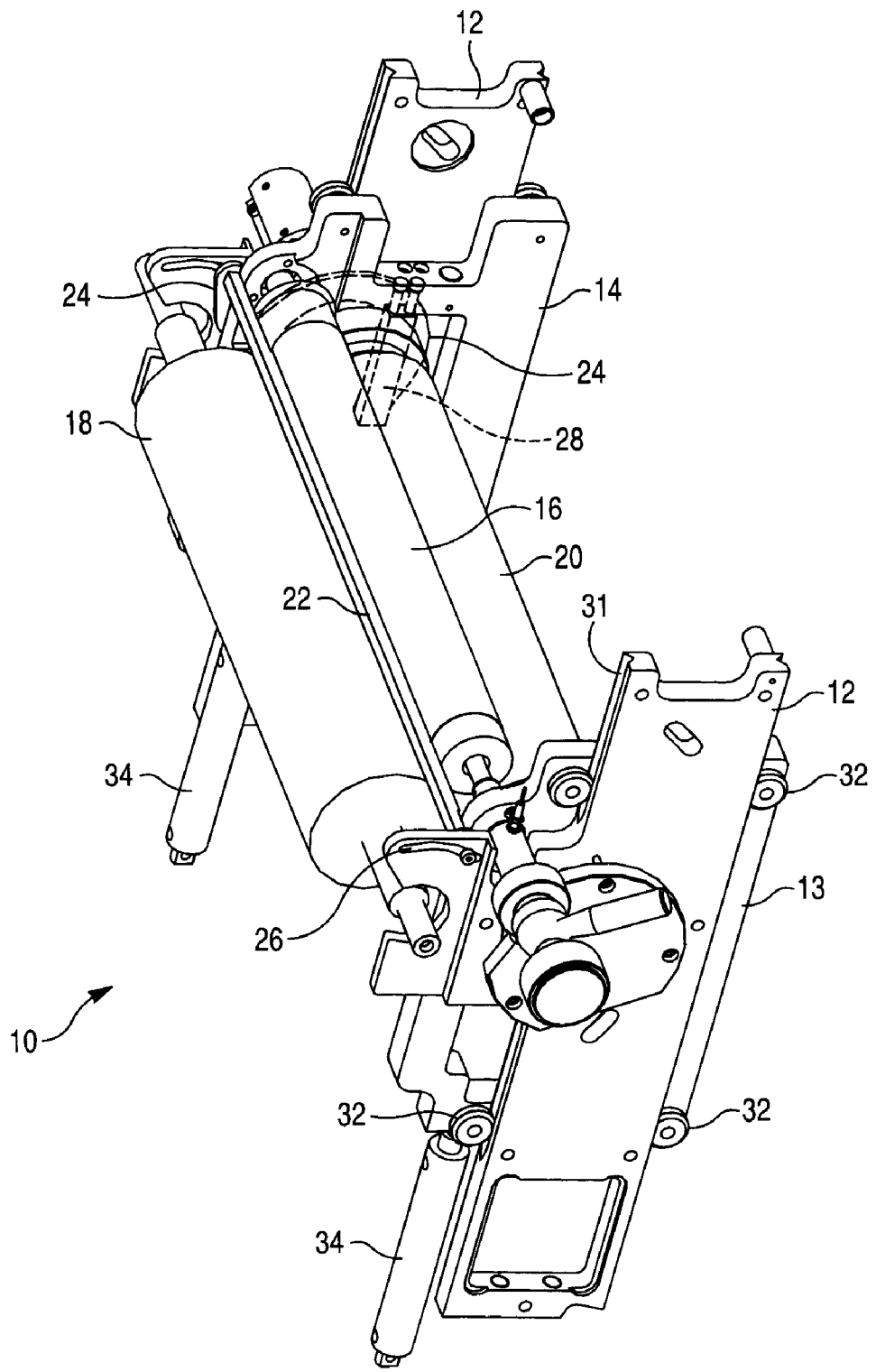
FIG. 1 is a schematic perspective drawing of a preferred embodiment of the present invention illustrated with an impression roll, an anilox roll and a plate roll.

Referring now to FIG. 1, there is shown a press 10 in accordance with a preferred embodiment of the present invention. The press 10 comprises a frame 12, a mounting assembly 13,14, and a guide assembly including elements 22 and 24. The mounting assembly includes at least one adjusting arm 13, and in a preferred embodiment, two adjusting arms 13 and 14, for mounting a roll 16 therein. The adjusting arm 13 and/or 14 is moveable to change position relative to the frame 12 in correspondence to a necessary change to accommodate a range of diameters of the roll 16. In a preferred embodiment, this movement is achieved in part by a power element 34, such as an air cylinder for example, which drives the arm 14 for upward movement, with gravity used for the downward movement. In a preferred embodiment, the arm(s) 13,14 rides on wheels 32 in a grooved slot 31. Accordingly, the power element 34 causes the arm 13 to ride up, with gravity used for the downward movement in the slot 31. A comparable power element (not shown) would be utilized to drive the arm 14.

It should be noted that the context for the example shown in FIG. 1 is a printing press with an anilox roll 18, an impression roll 20, and a plate roll 16. However, the present invention is in no way limited to configurations that use impression and anilox rolls, but has broad applicability to configurations, including diecutting configurations, where a range of roll diameters are utilized.

Figure 5:
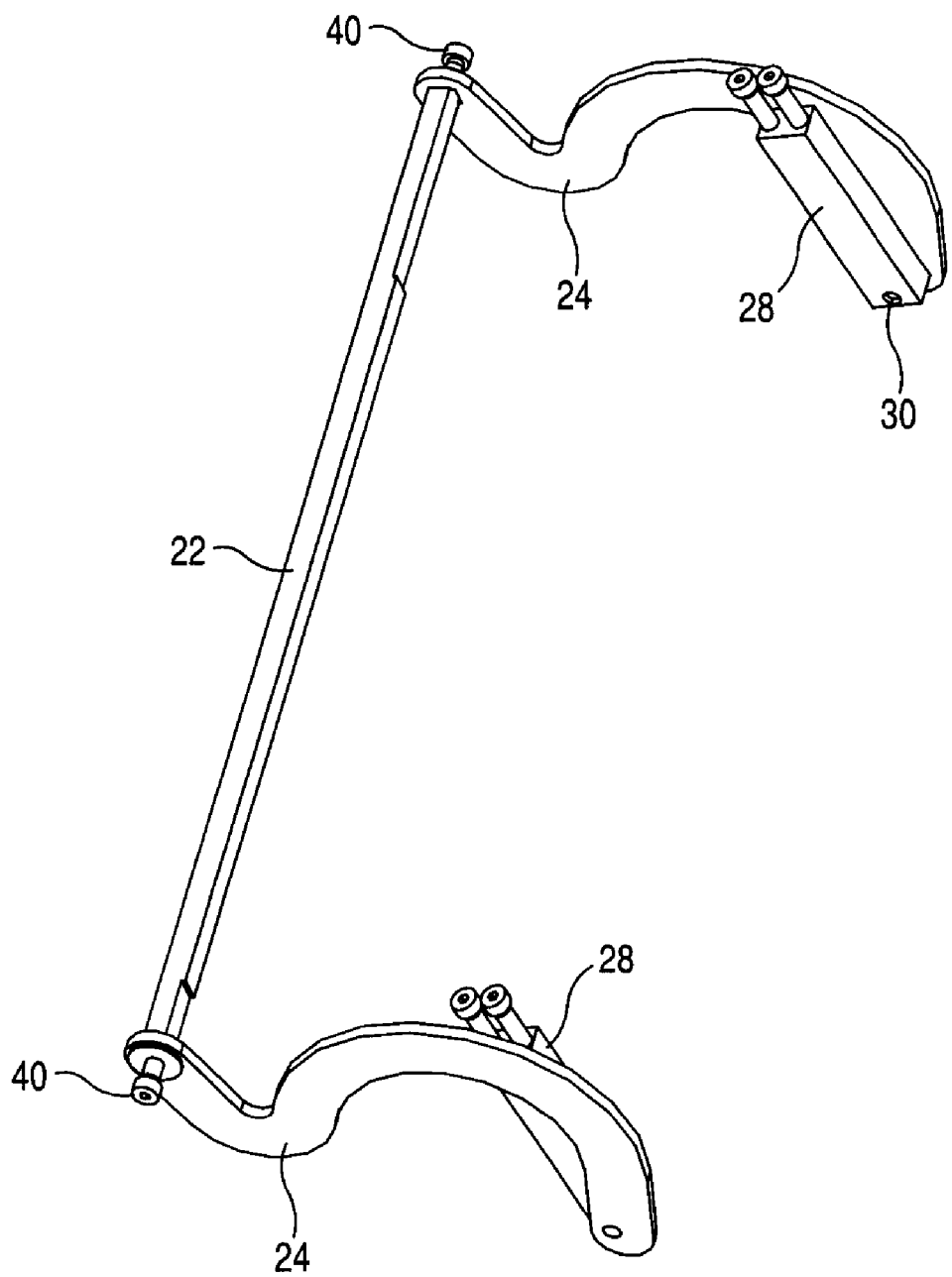
FIG. 5 is a specific schematic diagram of a preferred embodiment of the guard assembly of the present invention.

The guard assembly comprises in a preferred embodiment a guard 22 and at least one arm 24. In a preferred embodiment, the guard 22 comprises a bar. A preferred embodiment of this guard assembly is shown in FIG. 5. It can be seen that the at least one guard arm 24 has an S shape in order to clear the plate roll 16 and the impression roll 20 shown in FIGS. 1, 2, and 3. It should be understood that the guard arm 24 can take other shapes depending on what other structures are adjacent and must be cleared during movement.

Figure 2:
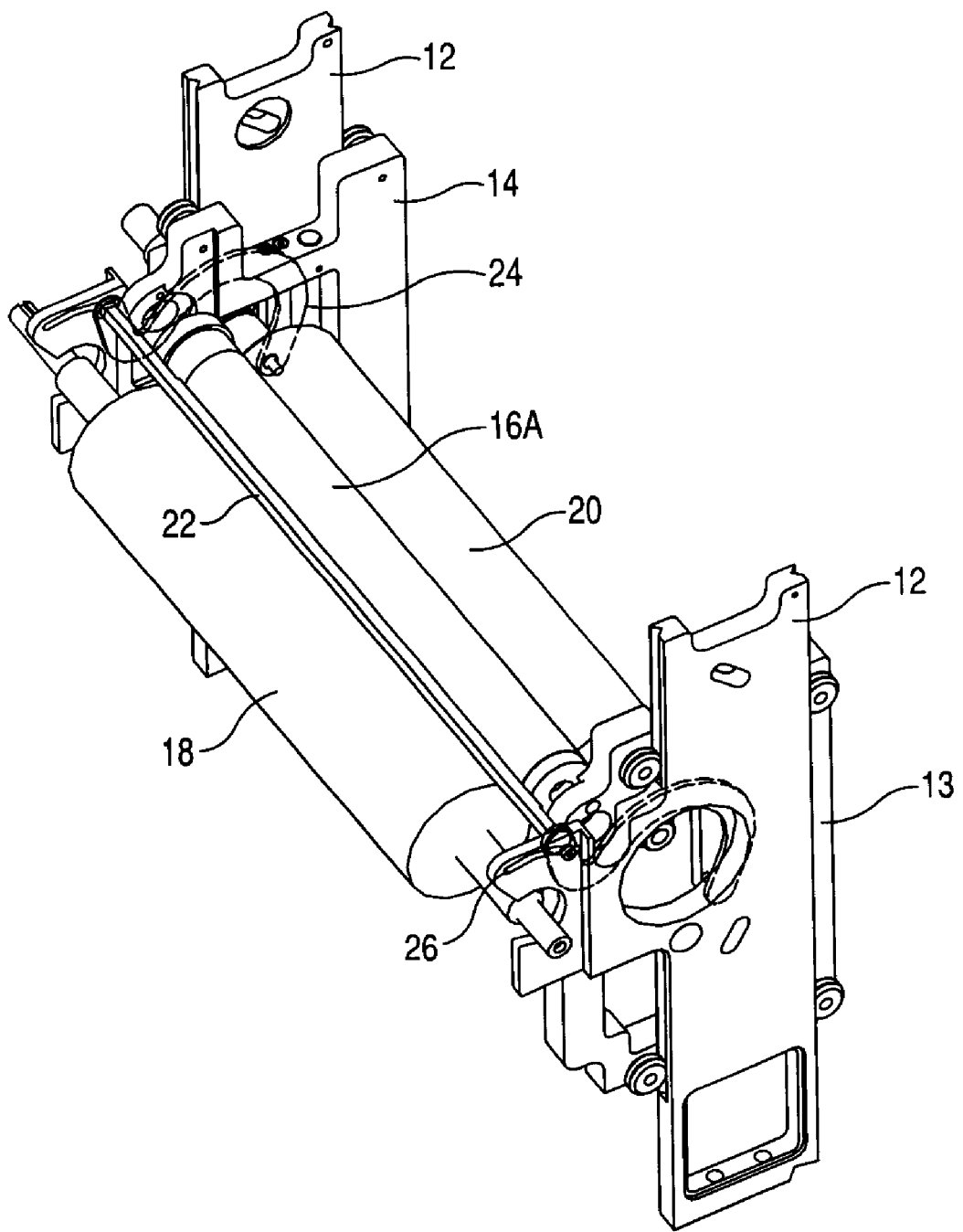
FIG. 2 is a perspective schematic diagram of a preferred embodiment of the present invention illustrated with a small diameter plate roll.

FIG. 2 illustrates the preferred embodiment of the present invention with a small diameter print roll 16(A).

Figure 3:
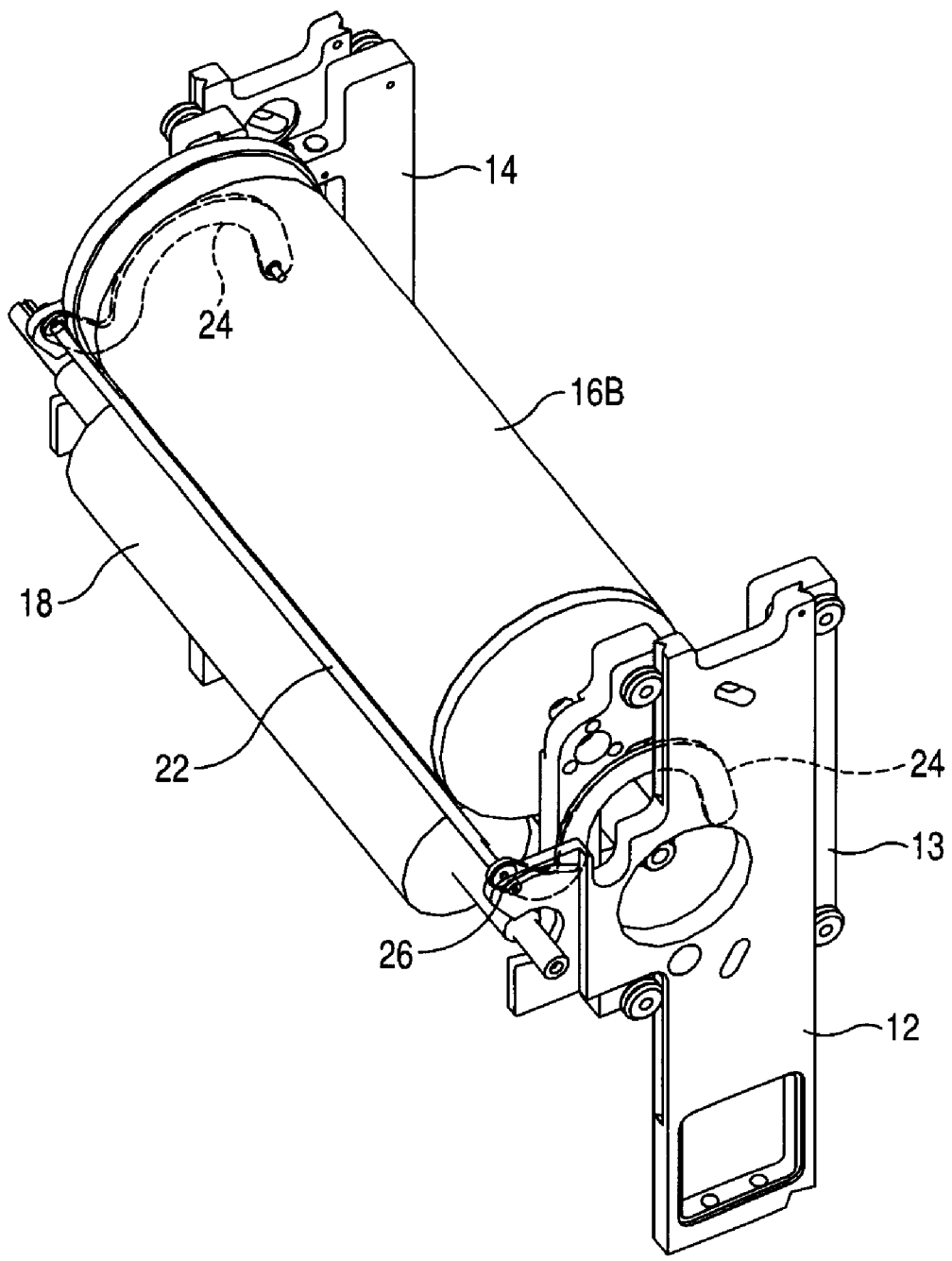
FIG. 3 is a perspective schematic diagram of a preferred embodiment of the present invention illustrated with a large diameter plate roll.

FIG. 3 illustrates the preferred embodiment of the present invention with a large diameter print roll 16(B).

Figure 4:
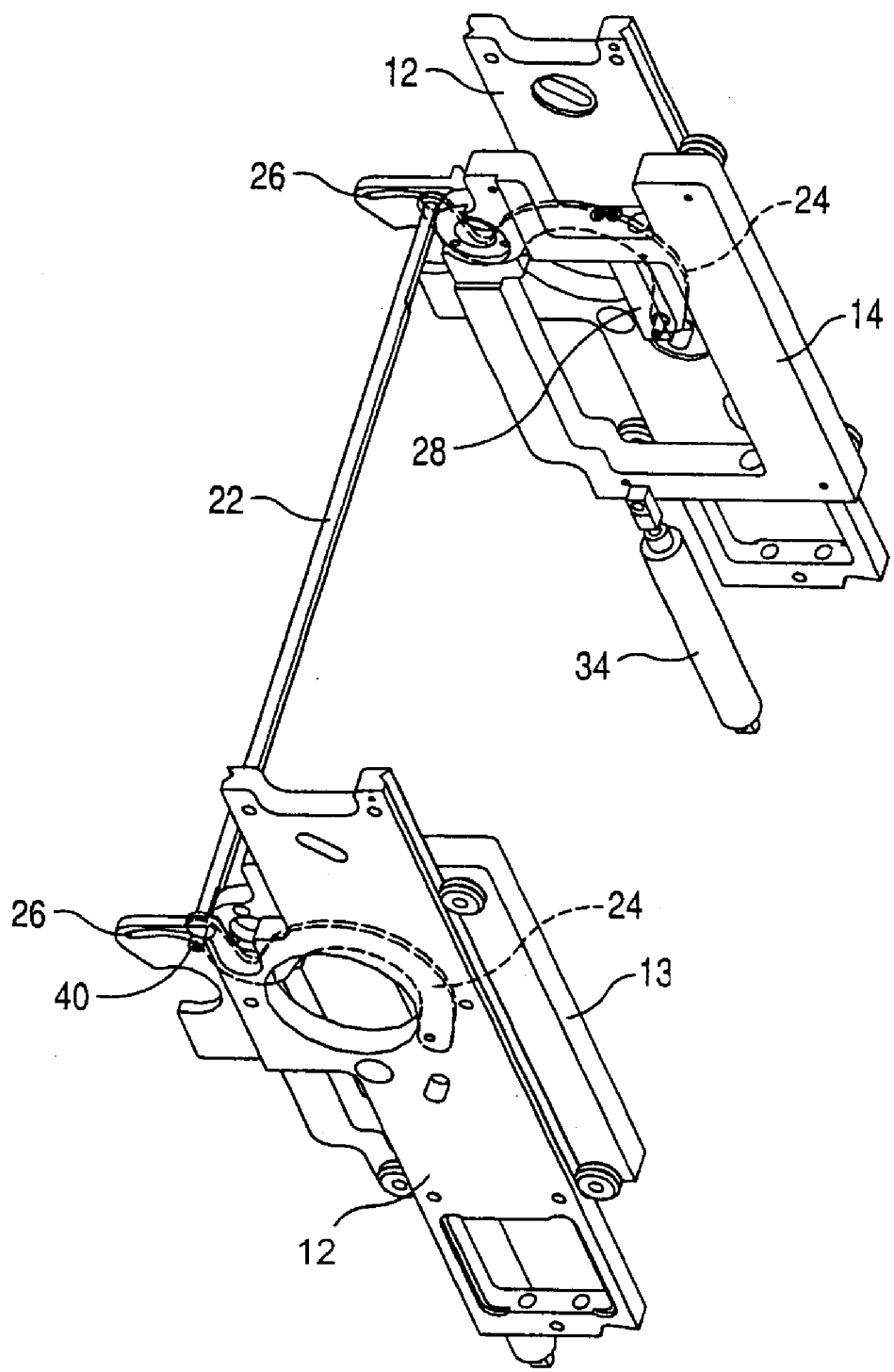
FIG. 4 is a schematic block diagram of a preferred embodiment of the frame, mounting assembly and, guard assembly for the present invention.

FIG. 4 illustrates the preferred embodiment showing only the frame 12, and the movable adjusting arms 13, 14, and with the guard assembly elements 22 and 24 in place. It can be seen that the guard arm 24 is attached at one end to the guard 22 and at substantially the same end to an adjustable attachment region 26 in the frame. In the embodiment shown in the figure, the region 26 comprises a slot. The guard arm 24 is also attached to a section 28 of the adjusting arm 14. The section 28 is also shown in FIG. 5. In a preferred embodiment the attachment to the adjusting arm(s) 13,14 is by means of a pivot axis 30, although the invention is not so limited, and other methods of attachment are contemplated.

In the preferred embodiment of the present invention shown in FIG. 1, the guard arm 24 pivotally attaches at one part thereof to the pivot axis 30 (shown in FIG. 5) on the adjusting arm 14. Additionally, the guard arm 24 is attached at a second point adjacent to the guard 22 by means of a guide slot 26. In the embodiments shown, the guide slot 26 is disposed in the frame 12, and a portion of or an extension 40 from the ends of the guard 22 ride inside the guide slot 26. However, this guide slot 26 can also be disposed in the guard arm 24 and a protrusion or other element in the frame 12 could ride in that slot. The guide slot will take a configuration depending on the configuration and the movement desired for the guard 22. In a preferred embodiment, the guide slot 26 is a radial guide slot which is centered on the anilox roll 20.

With the way that the arm 24 is connected between the adjusting arm 14 and the fixed frame 12, when the adjusting arm 14 moves upward, then the guard arm 24 rotates on the pivot axis 30 and moves outward following a predetermined guide path defined by the slot 26.

Figure 6:
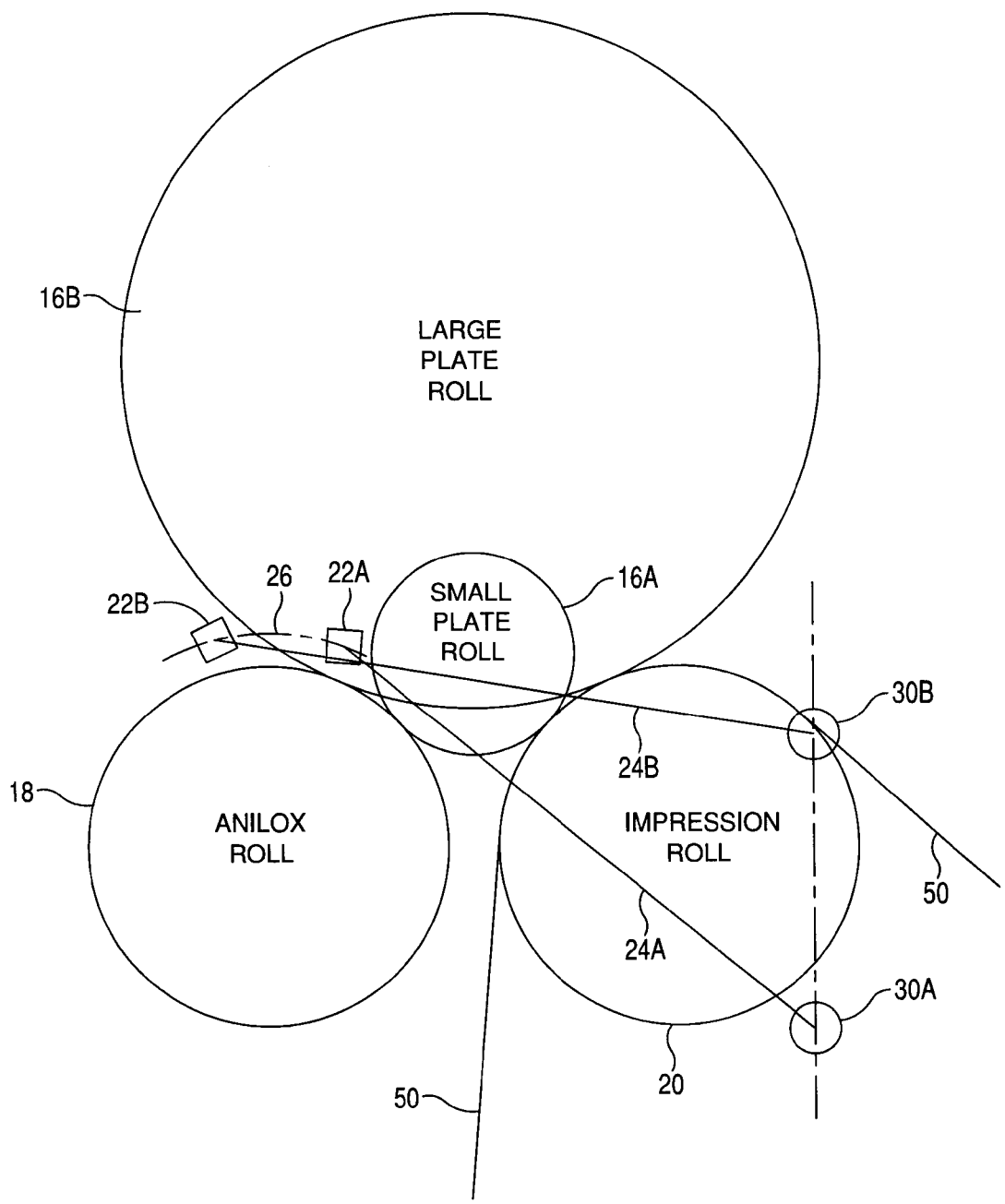
FIG. 6 is a schematic diagram of a printing press with an anilox roll, an impression roll, positioning for a small plate roll and positioning for a large plate roll.

FIG. 6 is a schematic diagram showing a small plate roll 16(A) and a large plate roll 16(B) in the context of an anilox roll 18 and an impression roll 20. One end of the guard 22, shown as position 22(B), illustrates the position of the guard 22 when the large plate roll 16(B) is utilized. It can be seen that the position of the guard 22 is at the pinch point just before the large plate roll 16(B) and the anilox roll 18 meet. For this position 22(B) of the guard 22, the guard arm 24(B) is shown connecting to the pivot point 30(B) in the adjusting arm 14.

FIG. 6 also shows in schematic format the configuration of the preferred embodiment when a small plate roll 16(A) is utilized in combination with the anilox roll 18 and the impression roll 20. In this case, the adjusting arm 14 has ridden down the frame 12 to place the small plate roll 16(A) in contact, or substantially in contact with the anilox roll 18 and the impression roll 20. This downward movement of the adjusting arm 14 is represented by the new pivot point 30(A). The guide arm 24(A) is shown placing the guard 22 at the position 22(A), to again be at the pinch point just before the small plate roll 16(A) and the anilox roll 18 touch or substantially touch. It should be noted that for purposes of ease of illustration the guide arm 24 has been represented as the straight line 24(A) for the positioning to accommodate the small plate roll 16(A), and a straight line 24(B) for the positioning to accommodate the large plate roll 16(B). It can be seen that the arc shown in FIG. 6 between the positions 22B and 22A represents the slot 26. A web 50 is shown in FIG. 6 for purposes of explanation only. The web can take a variety of other positions, depending on the configuration of the press.

Figure 7:
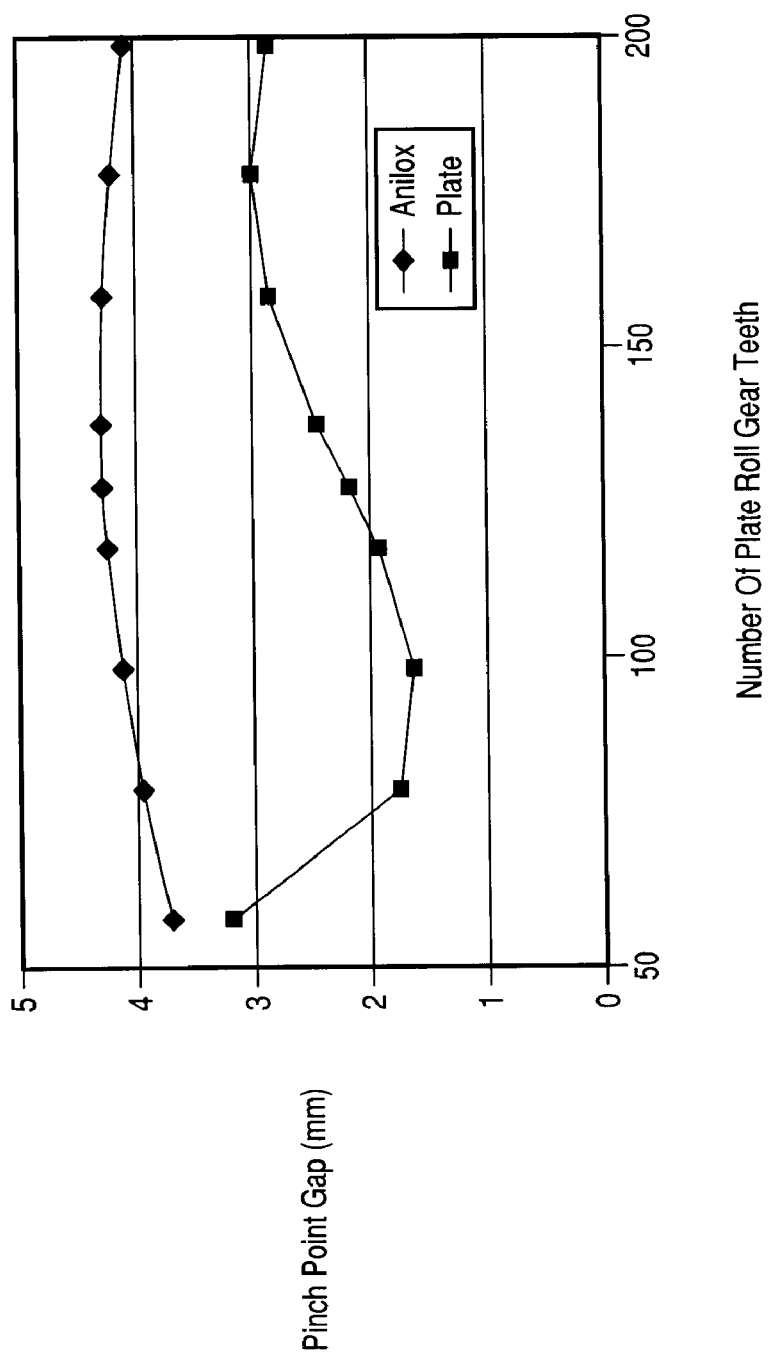
FIG. 7 is a graph of the gap between the guard and the anilox roll and the plate roll versus number of teeth in the diameter of these rolls.

Referring now the FIG. 7, there is shown a plot of pinch point gap data for a preferred design. The vertical axis in the figure represents the distance in millimeters between the guide 22 and the anilox roll 20 and the plate roll 16. The horizontal axis represents the number of teeth on the outer parameter for the plate roll 16, and indicates that the number of teeth increase as the plate roll diameter increases. The square dots represent data points for the gap between the guard 22 and the plate roll. The diamond points represent data points for the gap between the guard and the other element, which could be an anilox roll. It can be seen that a spacing is maintained between the guard 22 and the plate roll 16 within a predetermined range of variation. Likewise, it can be seen that the spacing between the guard 22 and the other element, which in this case is an anilox roll, is also maintained within a predetermined range, which may vary from predetermined range for the plate roll.

The curve of the guide slot 26 in order to achieve a gap within the predetermined range is obtained by using an iterative process of setting a curve dimension and calculating the gaps between one of the rolls or between both rolls and the guard. A PRO/E datum curve was created. It should be noted that this curve will be different for different configurations of a press. It was found that by decreasing the vertical pivot location length caused the pinch point guard 22 to move left in the slot. It was also found that increasing the horizontal pivot location length causes the pinch point guard 22 to change more radically relative to the plate roll 16, i.e., the pinch point guard gap distances were larger and the valleys grew deeper.

The present invention in a preferred embodiment has been disclosed utilizing a guide slot 26. However, the invention is not so limited. By way of example, the guard arm 24 may be comprised of two or more arms connected at pivot points therebetween. Accordingly, the attachment of the guard arm 24 to the frame 12 could be affixed to an axis, rather than to a slot.

It can be seen that the present invention facilitates the automatic placement of a guard across a pinch point between a roll and another element without the need to place an area guard around the entire press area. Accordingly, this local pinch point guard permits an operator to clean a printing plate or die cut roll without stopping the press. The guard 22 is automatically adjusted for any roll cylinder diameter. Accordingly, the guard automatically maintains a proper gap clearance within a predetermined range between the guard bar and the roll and between the guard bar and another element such as an anilox roll. The guard bar minimizes the obstruction of viewing an access for the area. Additionally, the guard allows a non-standard web path to be created without interfering with the guarding mechanism. It can be seen that the guard 22, in one embodiment, does not allow a gap of more than 4 mm between the guard and either roll or element.

The foregoing description of a preferred embodiment of the invention has been presented for purposes of illustration and description. It is not intended to be exhaustive or to limit the invention to the concise form disclosed, and modifications and variations are possible in light of the above teachings or may be acquired from the practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A press with a capability to adjust for multiple roll diameters, comprising:
   a frame;
   a mounting assembly with at least one adjusting arm for mounting a roll therein, the adjusting arm being moveable to change position relative to the frame in correspondence to a change in diameter of the roll;
   a guard assembly that provides a guard across a pinch point between the roll and another element, the guard assembly being moveably attached to the at least one adjusting arm and to a portion of the frame to automatically adjust a position of the guard when the at least one adjusting arm is moved in order to maintain a spacing between the guard and the roll within a predetermined range.

2. The press as defined in claim 1, wherein the guard assembly is automatically adjusted to also maintain a spacing between the guard and the other element within a predetermined range.

3. The press as defined in claim 2, wherein the guard assembly comprises at least one guard arm for holding said guard, with the at least one guard arm being pivotally attached at one part thereof to a pivot axis on said at least one adjusting arm, and attached at a second point adjacent to the guard via a guide slot.

4. The press as defined in claim 3, wherein there are two adjustment arms in the mounting assembly and two guard arms in the guard assembly, with each guard arm pivotally attached to a different one of the adjustment arms.

5. The press as defined in claim 3, wherein the at least one guard arm has substantially the shape of an S.

6. The press as defined in claim 3, wherein the guide slot is a radial slot centered on an anilox roll.

7. The press as defined in claim 3, wherein the guide slot is disposed in the frame.

8. The press as defined in claim 1, wherein the guard comprises a guard bar.

9. The press as defined in claim 1, wherein the at least one guard arm comprises at least two pieces.

10. The press as defined in claim 1, wherein the mounting assembly is moved by a power element.

11. The press as defined in claim 1, wherein the press is a printing press.

12. The press as defined in claim 1, wherein the press is a diecutter.

13. A method for adjusting a pinch point guard in a press, comprising the steps of:
    moving a mounting assembly having at least one adjusting arm for mounting a roll therein relative to a frame in correspondence to a change in diameter of the roll; and
    automatically moving a guard assembly that provides a guard across a pinch point between the roll and another element comprising a guard bar and being movably attached to the at least one adjusting arm and to a portion of the frame, the guard assembly being moved in unison with the movement of the mounting assembly to adjust a position of the guard bar to automatically maintain a spacing between the guard bar and the roll and between the guard and the another element within a predetermined range.

14. The method as defined in claim 13, wherein the step of automatically moving a guard bar comprises causing the guard bar to follow a radial motion.

15. The method as defined in claim 14, wherein the radial motion is centered on an anilox roll.

16. The method as defined in claim 13, wherein the guard assembly comprises at least one guard arm for holding said guard, with the at least one guard arm being pivotally attached at one part thereof to a pivot axis on said at least one adjusting arm, and attached at a second point adjacent to the guard via a guide slot.

17. The method as defined in claim 16, wherein the at least one guard arm has substantially the shape of an S.

18. The method as defined in claim 17, wherein the guide slot is a radial slot centered on an anilox roll.

19. The method as defined in claim 17, wherein guide slot is disposed in the frame.

* * * * *